United States Patent
Miyoshi et al.

(10) Patent No.: US 6,944,208 B2
(45) Date of Patent: Sep. 13, 2005

(54) INTERFERENCE SIGNAL CANCELING APPARATUS AND INTERFERENCE SIGNAL CANCELING METHOD

(75) Inventors: Kenichi Miyoshi, Yokohama (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 696 days.

(21) Appl. No.: 09/936,727

(22) PCT Filed: Jan. 15, 2001

(86) PCT No.: PCT/JP01/00205

§ 371 (c)(1),
(2), (4) Date: Sep. 17, 2001

(87) PCT Pub. No.: WO01/54328

PCT Pub. Date: Jul. 26, 2001

(65) Prior Publication Data

US 2003/0067971 A1 Apr. 10, 2003

(30) Foreign Application Priority Data

Jan. 19, 2000 (JP) .................................. 2000-010877

(51) Int. Cl.[7] .......................... H04B 1/69; H04B 1/707; H04B 1/713
(52) U.S. Cl. ...................................... 375/148; 375/150
(58) Field of Search ................................. 375/144, 148, 375/346, 130, 142, 147, 150, 152; 370/286, 342, 441

(56) References Cited

U.S. PATENT DOCUMENTS

| | | |
|---|---|---|
| 6,157,685 A | 12/2000 | Tanaka et al. |
| 6,222,498 B1 * | 4/2001 | Ishii et al. .................. 343/853 |
| 6,282,233 B1 * | 8/2001 | Yoshida ....................... 375/148 |
| 6,584,115 B1 * | 6/2003 | Suzuki ........................ 370/441 |
| 6,614,766 B1 * | 9/2003 | Seki et al. ................... 370/286 |
| 6,667,964 B1 * | 12/2003 | Seki et al. ................... 370/342 |

FOREIGN PATENT DOCUMENTS

| | | |
|---|---|---|
| CA | 2258376 | 7/1999 |
| JP | 10126383 | 5/1998 |
| JP | 11205286 | 7/1999 |
| JP | 11251959 | 9/1999 |
| JP | 11266180 | 9/1999 |
| JP | 11298388 | 10/1999 |
| JP | 11331125 | 11/1999 |

OTHER PUBLICATIONS

International Search Report dated Apr. 3, 2001.

* cited by examiner

Primary Examiner—Tesfaldet Bocure
Assistant Examiner—Krista Flanagan
(74) Attorney, Agent, or Firm—Stevens, Davis, Miller & Mosher, LLP

(57) ABSTRACT

An interference cancellation apparatus and method may remove interference from a directional array combined signal that is received by an array antenna and array combined on a directivity-by-directivity basis. The apparatus and method input a plurality of array combined signals subjected to array combining on a directivity-by-directivity basis to select an array-combined signal corresponding to a path. A correlation value is detected between the selected array combined signal and a spread code. Detected correlation values are combined to generate a combined value, and the combined value is used to generate a temporarily determined value. The temporarily determined value is re-spread to generate a re-spread signal, and re-spread signals are sorted for every directivity, on a per path basis. The re-spread signals sorted for every directivity are then added to generate a replica signal.

4 Claims, 7 Drawing Sheets

INTERFERENCE SIGNAL CANCELING APPARATUS AND INTERFERENCE SIGNAL CANCELING METHOD

TECHNICAL FIELD

The present invention relates to an interference signal canceling apparatus, which is mounted on a base station apparatus used in a mobile communication system of CDMA (Code Division Multiple Access) and which is used in combination with an array antenna, and relates to its interference signal canceling method.

BACKGROUND ART

In a mobile station communication system of CDMA, there is a problem in which since signals of a plurality of users are transmitted in the same band, reception quality deteriorates as a result of undergoing influence of interference signals.

An array antenna is known as an apparatus for eliminating the interference. The array antenna is an antenna that is capable of setting reception directivity freely to intensively receive only a desired signal by providing adjustment of each of amplitude and phase to a signal received by each antenna element after multiplying the received signal by weighting factor (hereinafter referred to as "reception weight").

Moreover, as another apparatus for canceling interference, there is an interference signal canceling apparatus that cancels signals (interference) transmitted from users other than a desired user from received signals so as to extract a desired signal.

Then, it can be expected that the use of combination of the array antenna and the interference canceling apparatus provide a larger interference cancellation effect than each independent use.

However, when the array antenna and the interference signal canceling apparatus are simply combined, the interference signal canceling apparatus must be individually provided every channel corresponding to each user, and this increases the amount of calculations and the apparatus scale, so that some contrivance is required to be provided.

Conventionally, there is disclosed an interference canceling apparatus, which is combined with the a array antenna and which aims to reduce the amount of calculations and the apparatus scale in Unexamined Japanese Patent Publication HEI 11-205286 and the like.

An explanation will be given of the conventional interference canceling apparatus, which is combined with the array antenna, using a block diagram of FIG. 1. The explanation set forth below refers to a case on the assumption that the number of stages of the interference canceling apparatuses is 3, the number of users is 3, and the number of multipath is 3.

Moreover, since the first stage and second stage have the same configuration as illustrated in FIG. 1, the explanation of the second stage is omitted.

In FIG. 1, antennas 11-1 and 11-2 form an array antenna, and a signal (hereinafter referred to as "first received signal") received by the antenna 11-1 is inputted to ICUs (Interference Canceling Units) 12-1 to 12-3 and a delayer 13-1. Similarly, a signal (herainafter referred to as "second received signal") received by the antenna 11-2 is inputted to ICUs (Interference Canceling Units) 12-1 to 12-3 and a delayer 13-2.

ICUs 12-1 to 12-3 are provided to correspond to users 1 to 3, respectively, to generate replica signals in connection with the first received signal and the second received signal (hereinafter referred to as "first replica signal" and "second replica signal", respectively). The first replica signals generated by ICUs 12-1 to 12-3 are inputted to adders 14-1 and 15-1 and the second replica signal generated by ICUs 12-1 to 12-3 are inputted to adders 14-2 and 15-2. The configuration of ICUs 12-1 to 12-3 will be described later.

The delayers 13-1 and 13-2 delay the received signals by the processing time of ICUB 12-1 to 12-3, and each outputs the resultant to each of the adders 14-1 and 14-2.

At the adder 14-1, the first replica signal of each of the respective users 1 to 3 is subtracted from the first signal. Also, the second replica signal of each of the respective users 1 to 3 is subtracted from the second signal. This cancels all replica signals of all users from the received signals of the respective antennas. The output signals of adders 14-1 and 14-2 from which the replica signals of all users are canceled from the received signals are referred to as a first residual signal and a second residual signal, respectively. The first residual signal and the second residual signal are inputted to adders 15-1 and 15-2 and the delayers 13-1 and 13-2 of the second stage.

The adder 15-1 adds the first replica signal and the first residual signal on a user-by-user basis. Similarly, the adder 15-2 adds the second replica signal and the second residual signal on a user-by-user basis. This cancels the interference signal from the received signal on an antenna-by-antenna basis so as to obtain a desired signal. Namely, for example, when attention is paid to user 1, the signal of user 2 and the signal of user 3, which cause interference with user 1, are eliminated from the received signal to obtain a desired signal about user 1 for every antenna. The same is applied to the signal of user 2 and the signal of user 3. The obtained desired signals are inputted to ICUs 12-1 to 12-3 of the second stage, respectively.

According to the conventional interference signal canceling apparatus, the same processing as performed in the first stage is repeated in the second stage, so that the accuracy of replica signal is improved and that of the interference signal cancellation is improved. In other words, the more the number of stages are increased, the more the interference signals about the respective users sent from the other users are canceled.

The output signals of the adders 15-1 and 15-2 of the second stage are demodulated by the ICUs 16-1 to 16-3. This obtains demodulated signals 1 to 3 of the users 1 to 3. The configuration of each of the ICUs 16-1 to 16-3 will be described later.

An explanation will be next given of ICUs 12-1 to 12-3 and ICUs 16-1 to 16-3. In this case, ICUs 12-1 to 12-3 of the first and second stages have the same configuration and operation, respectively. Also, ICUs 16-1 to 16-3 of the third stage have the same configuration and operation. Accordingly, in the explanation set forth below, the ICU 12-1 of the first stage corresponding to the user 1 and the ICU 16-1 of the third stage are explained, and the explanation of the respective ICUs corresponding to the user 2 and the user 3 is omitted.

FIG. 2 is a block diagram illustrating a schematic configuration of ICU 12-1 illustrated in FIG. 1, and FIG. 3 is a block diagram illustrating a schematic configuration of ICU 16-1 illustrated in FIG. 1.

In FIG. 2 and FIG. 3, it is assumed that the number of multipath to the radio receiving apparatus is 3 and that the respective configuration parts for the respective paths are shown by P1 to P3, respectively. Since the respective configuration parts for the respective paths have the same configuration and operation, only the first path P1 is explained, and the explanation of the second path P2 and third path P3 is omitted.

In FIG. 2, the ICU 12-1 is divided into a front stage S1 where the signals received by the respective antennas 11-1 and 11-2 are subjected to despreading and then the resultants are multiplied by reception weights of the receptive antennas, respectively; a middle stage S2 where RAKE combining and temporary determination are carried out; and a back stage S3 where the signal, subjected to temporary determination, is multiplied by a replica weight to perform re-spreading so as to generate a replica signal.

The first signal received by the antenna 11-1 is inputted to a despreader 21-1 and the second signal received by antenna 11-2 is inputted to a despreader 21-2. The despreader 21-1 provides despreading to the first received signal to generate a despread signal X1. Similarly, the despreader 21-2 provides despreading to the second received signal to generate a despread signal X2. Despread signals X1 and X2 are inputted to multipliers 22-1, 22-2, and a reception weight calculator 23.

The reception weight calculator 23 calculates weights W1 and W2 of each antenna, and outputs the resultants to multipliers 22-1 and 22-1, and a complex conjugate calculator 30-1 and 30-2.

The multipliers 22-1 and 22-2 multiply despread signals X1 and X2 by reception weights W1 and W2, respectively, and an adder 24 adds the output signal of the multiplier 22-1 and the output signal of the multiplier 22-2 to carry out array combining. The signal subjected to array combining is outputted to a channel estimator 25 and a multiplier 26.

The channel estimator 25 performs the channel estimation based on the signal subjected to the array combining, and outputs the resultant to a complex conjugate $h_a^*$ of a channel estimation value $h_a$ to the multiplier 26, and outputs the channel estimation value $h_a$ to a multiplier 29. The multiplier 26 multiplies the signal subjected to the array combining by the complex conjugate $h_a^*$ of the channel estimation value. This compensates for phase rotation of the signal subjected to the array combining. The output signal of the multiplier 26 of each of paths P1 to P3 is inputted to a RAKE combiner 27 of the middle stage S2.

The RAKE combiner 27 provides RAKE combining to the signals of the respective paths P1 to P3 subjected to array combining, and a determining device 28 performs temporary determination to the RAKE combined signal outputted from the RAKE combiner 27. A signal d, which has been subjected to temporary determination and output from the determining device 28, is inputted to the multiplier 29 of the back stage S3.

The multiplier 29 of the back stage S3 multiplies the signal d subjected to temporary determination by the channel estimation value $h_a$ for each of paths P1 to P3, and the resultants are inputted to multipliers 31-1 and 31-2, respectively.

The complex conjugate calculator 30-1 and 30-2 calculate the complex conjugates W1* and W2* of reception weights and outputs the resultants to the multipliers 31-1 and 31-2, respectively.

The multipliers 31-1 and 31-2 multiply the output signals of the multiplier 29 by the complex conjugates W1* and W2* of reception, respectively. This obtains replica signals Xr1 and XR2 corresponding to X1 and X2 respectively.

A re-spreader 32-1 spreads the replica signal Xr1 and outputs the resultant to an adder 33-1. Similarly, a re-spreader 32-2 spreads the replica signal Xr2 and outputs the resultant to an adder 33-2.

The adder 33-1 adds the replica signal Xr1, which has been re-spread for each of paths P1 to P3, to generate a first replica signal and outputs the first replica signal to an adder 15-1. Similarly, The adder 33-2 adds the replica signal Xr2, which has been re-spread for each of paths P1 to P3, to generate a second replica signal and outputs the second replica signal to an adder 15-2.

Next, the ICU 16-1 of the third stage will be described. As illustrated in FIG. 3, the ICU 16-1 of the third stage has substantially the same configuration as that of the front stage S1 of the ICU 12-1 and that of the middle stage S2. Accordingly, the same reference numerals are added to the same configuration parts as those of the ICU 12-1 of FIG. 2, and the explanation of the ICU 16-1 of the third stage will be omitted.

The output signal of the determining device 28 of the ICU 16-1 is outputted to an external apparatus (not shown) as a demodulation signal.

In this way, the conventional signal canceling apparatus generates the replica signal for every antenna that forms the array antenna so as to improve the reduction in the amount of calculations and the circuit scale.

However, it is assumed that the number of users is L, the number of antennas is K, and the number of paths is M. Since it is necessary to provide (L×K×M) reception weight multipliers and (L×M) reception weight calculators to the conventional signal canceling apparatus as an entirety of apparatus, further reduction in the amount of calculations and the circuit scale is required.

DISCLOSURE OF INVENTION

It is an object of the present invention is to provide an interference signal canceling apparatus, which is used in combination with an array antenna and which has a small amount of calculations and a small circuit scale, and its interference signal canceling method.

The above objective can be attained by forming directivity using the array antenna, performing selection of directivity every antenna and distribution to generate a replica signal on a directivity-by-directivity basis and to cancel interference.

BEST MODE FOR CARRYING OUT THE INVENTION

Figure 4:
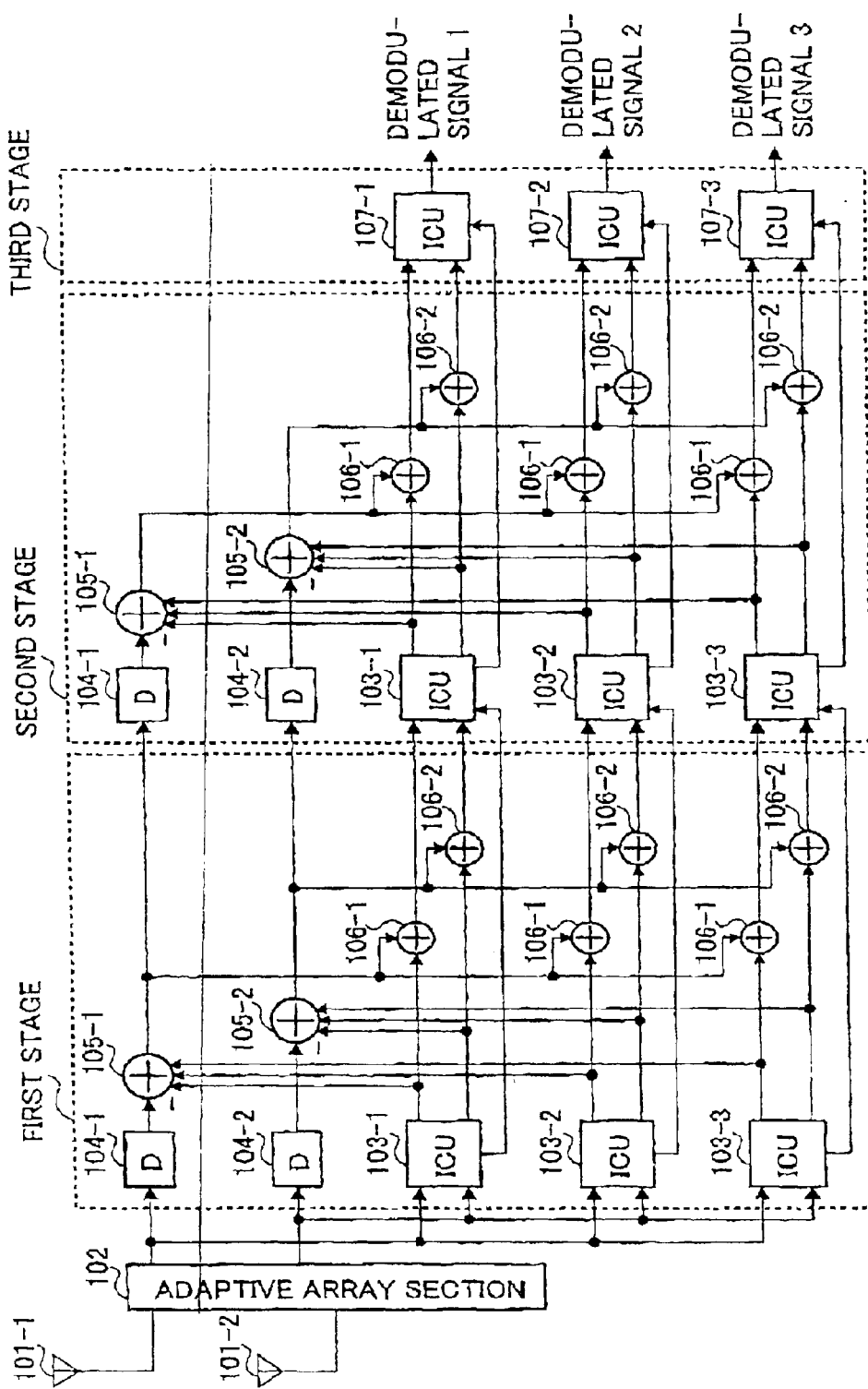
FIG. 4 is a block diagram illustrating the configuration of an interference signal canceling apparatus according to one embodiment of the present invention.

The configuration of the interference signal canceling apparatus that combines with an array antenna according to the embodiment of the present invention will be specifically described with reference to the drawings accompanying herewith. FIG. 4 is a block diagram illustrating the configuration of the interference signal canceling apparatus according to one embodiment of the present invention. The explanation set forth below refers to a case on the assumption that the number of stages of the interference canceling apparatuses is 3, the number of users is 3, the number of directivities is 2 (A, B), and the number of multipath is 3.

Moreover, this embodiment explains a case in which the signals, which are transmitted from the respective users and which come via the respective paths, are divided into some groups based on the direction of arrival to form a directivity on a group-by-group basis and to perform array combining. The method for performing the array combining on the group-by-group basis is specifically described in Unexamined Japanese Patent Publication HEI 11-327961.

Still moreover, since the first stage and second stage have the same configuration as illustrated in FIG. 4, the explanation of the second stage is omitted.

In FIG. 4, antennas 101-1 and 101-2 form an array antenna, and a signal (hereinafter referred to as "first received signals") received by the antenna 101-1 and a signal (hereinafter referred to as "second received signal") received by the antenna 101-2 are inputted to an adaptive array section 102.

The adaptive array section 102 multiplies the first received signal and the second received signal by the receiving weights, adds the resultants to perform array combining in order to form directivity A and directivity B. The internal configuration of the adaptive array section 102 will be specifically described later.

A signal with directivity A outputted from the adaptive array section 102 (hereinafter referred to as "directional signal A") is inputted to ICUs 103-1 to 103-3 and a delayer 104-1. Similarly, a signal with directivity B outputted from the adaptive array section 102 (hereinafter referred to as "directional signal B") is inputted to ICUs 103-1 to 103-3 and a delayer 104-2.

ICUs 103-1 to 103-3 are provided to correspond to users 1 to 3, respectively, and generate replica signals (hereinafter referred to as "replica signal A", and "replica signal B", respectively) in connection with the directional signal A and the directional signal B. The replica signal A generated by ICUs 103-1 to 103-3 are inputted to an adders 105-1 and an adder 106-1, and the replica signal B generated by ICUs 103-1 to 103-3 are inputted to an adders 105-2 and an adder 106-2. The configuration of ICUs 103-1 to 103-3 will be described later.

The delayers 104-1 and 104-2 delay the received signals by processing time of ICUs 103-1 to 103-3, and output the resultants to the corresponding adders 105-1 and 105-2, respectively.

The adder 105-1 substrates the replica signal A of each of the respective users 1 to 3 from the directional signal A.

Similarly, the adder 105-2 substrates the replica signal B of each of the respective users 1 to 3 from the directional signal A. This cancels all replica signals of all users from the respective directional signals from the received signals.

The output signals of adders 105-1 and 105-2 from which the replica signals of all users are canceled from the received signals are hereinafter referred to as "residual signal A" and "residual signal B", respectively. The residual signal A and the residual signal B are inputted to adders 106-1, 106-2 and the delayers 104-1 and 104-2 of the second stage.

The 106-1 adds the replica signal A and the residual signal A on a user-by-user basis. Similarly, the 106-1 adds the replica signal B and the residual signal B on a user-by-user basis. This cancels the interference signal from the received signal on a directivity-by-directivity basis so as to obtain a desired signal. For example, when attention is paid to user 1, the signal of user 2 and the signal of user 3, which cause interference with user 1, are eliminated from the received signal to obtain a desired signal about user 1 on the directivity-by-directivity basis. The same is applied to the signal of user 2 and the signal of user 3. The obtained desired signals are inputted to ICUs 103-1 to 103-3 of the second stage, respectively.

According to the interference signal canceling apparatus of this embodiment, the same processing as performed in the first stage is repeated in the second stage, so that the accuracy of replica signal is improved and that of the interference signal cancellation is improved. In other words, the more the number of stages are increased, the more the interference signals about the respective users sent from the other users are canceled.

The output signals of the adders 106-1 and 106-2 of the second stage are demodulated by ICUs 107-1 to 107-3. This obtains demodulated signals 1 to 3 of the users 1 to 3. The configuration of each of the ICUs 107-1 to 107-3 will be described later.

Figure 5:
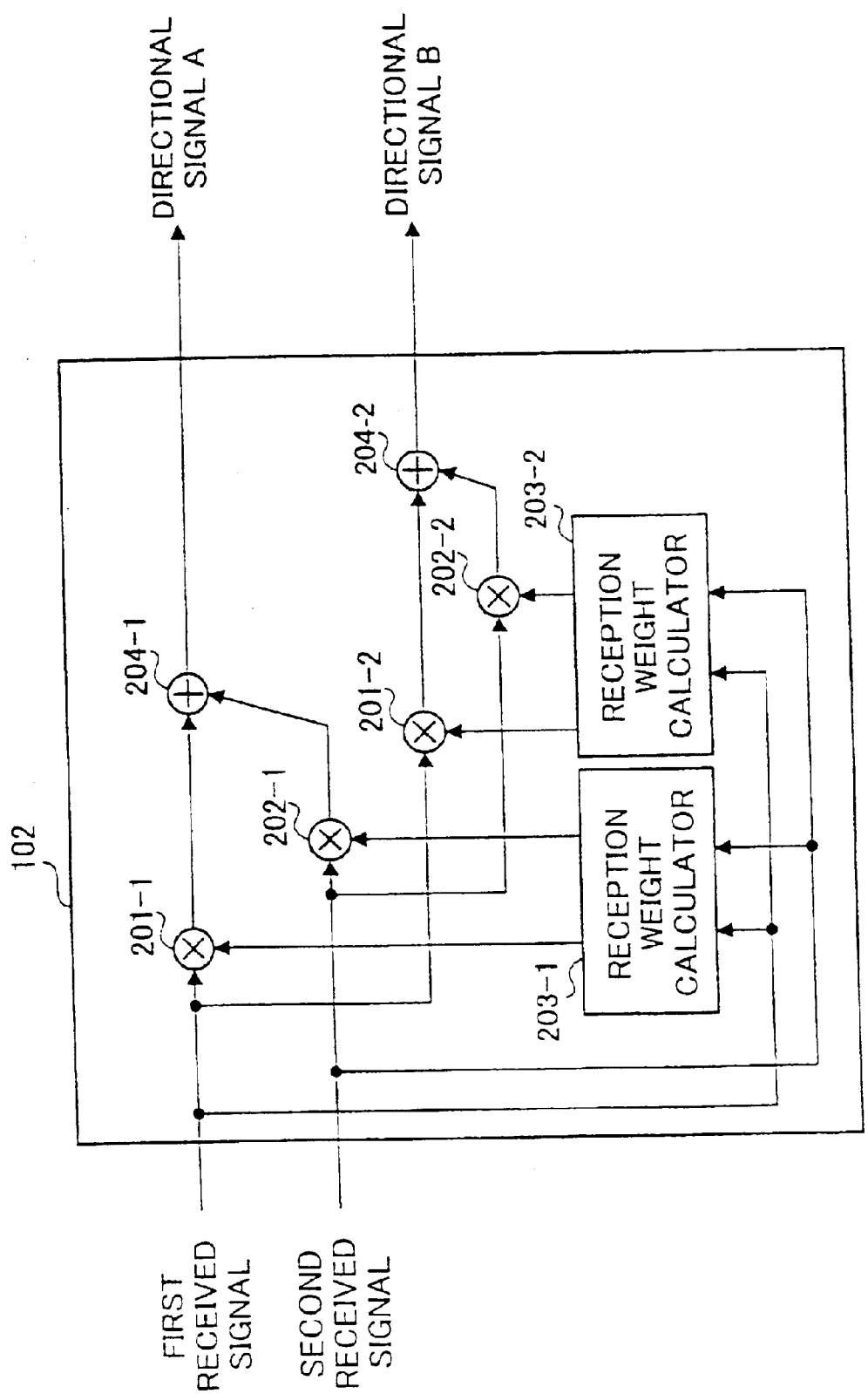
FIG. 5 is a block diagram illustrating the configuration of a part of an adaptive array of the interference signal canceling apparatus according to the above embodiment of the present invention.

An explanation will be next given of the adaptive array 102. FIG. 5 is a block diagram illustrating the schematic configuration of the adaptive array illustrated in FIG. 4.

In FIG. 5, the first signal received by the antenna 11-1 is inputted to multipliers 201-1, 202-1, and reception weight calculators 203-1, 203-2, and the second signal received by the antenna 11-2 is inputted to multipliers 201-2, 202-2, and reception weight calculators 203-1, 203-2.

The reception weight calculator 203-1 calculates a reception weight of each antenna, and outputs the reception weight with respect to the first received signal to the multiplier 201-1 and the reception weight with respect to the second received signal to the multiplier 202-1. Similarly, the reception weight calculator 203-2 calculates a reception weight of each antenna, and outputs the reception weight with respect to the first received signal to the multiplier 201-2 and the reception weight with respect to the second received signal to the multiplier 202-2.

The multiplier 201-1 multiplies the reception weight to the first reception signal from the reception weight calculator 203-1, and the multiplier 201-2 multiplies the reception weight to the first reception signal from the reception weight calculator 203-2. Similarly, the multiplier 202-1 multiplies the reception weight to the second reception signal from the reception weight calculator 203-1, and the multiplier 202-2 multiplies the reception weight to the second reception signal from the reception weight calculator 203-2.

An adder 204-1 performs array combining of the directivity A by adding the output of the multiplier 201-1 and that of the multiplier 202-1 so as to output the directional signal A. Similarly, an adder 204-2 performs array combining of the directivity B by adding the output of the multiplier 201-2 and that of the multiplier 202-2 so as to output the directional signal B.

The directional signal A and the directional signal B are outputted to the ICUs 103-1 to 103-3 and the delayers 104-1, 104-2, respectively.

An explanation will be next given of ICUs 103-1 to 103-3 and ICUs 107-1 to 107-3. In this case, ICUs 103-1 to 103-3 of the first and second stages have the same configuration and operation, respectively. Also, ICUs 107-1 to 107-3 of the third stage have the same configuration and operation. Accordingly, in the explanation set forth below, the ICU 103-1 of the first stage corresponding to the user 1 and the ICU 107-1 of the third stage are explained, and the explanation of the respective ICUs corresponding to the user 2 and the user 3 is omitted.

Figure 6:
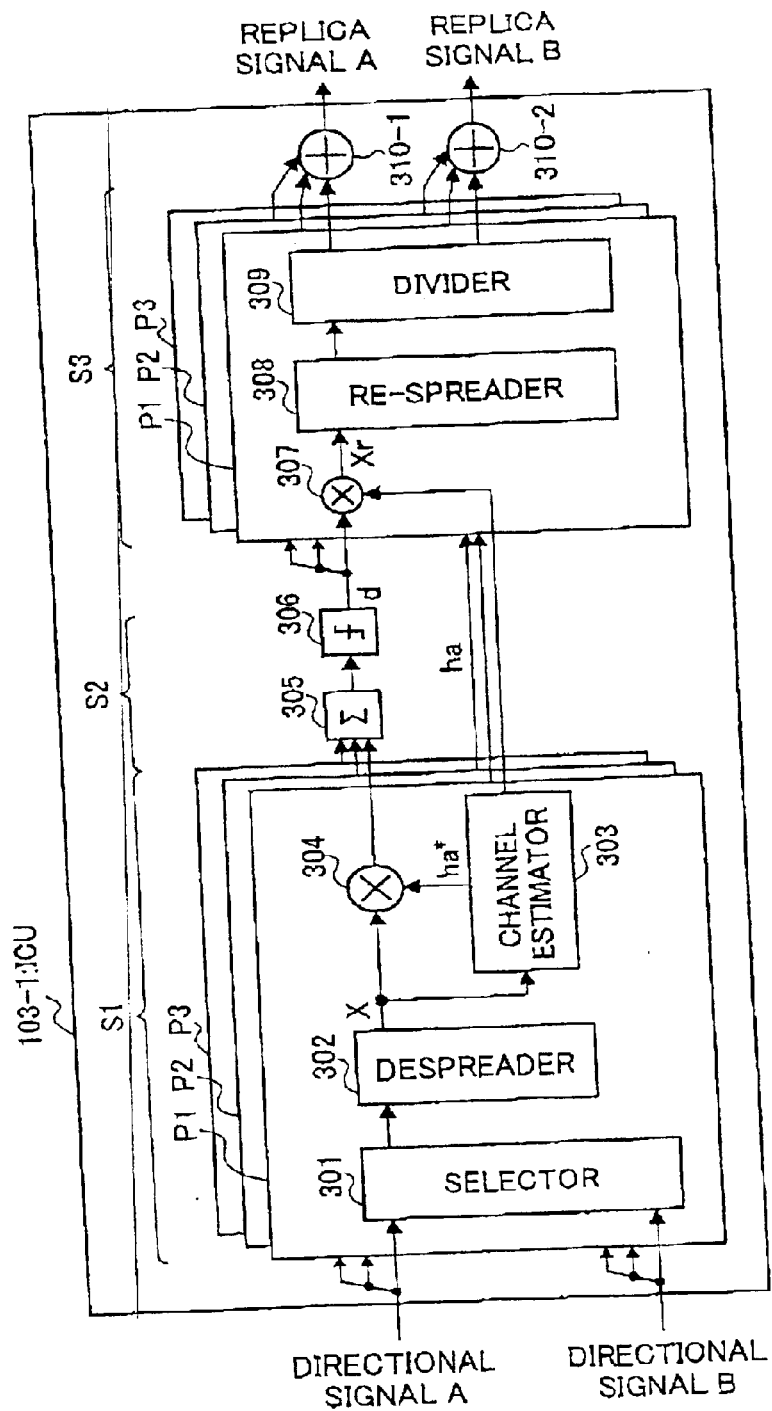
FIG. 6 is a block diagram illustrating the configuration of ICU of each of first and second stages of the interference signal canceling apparatus according to the above embodiment of the present invention.
Figure 7:
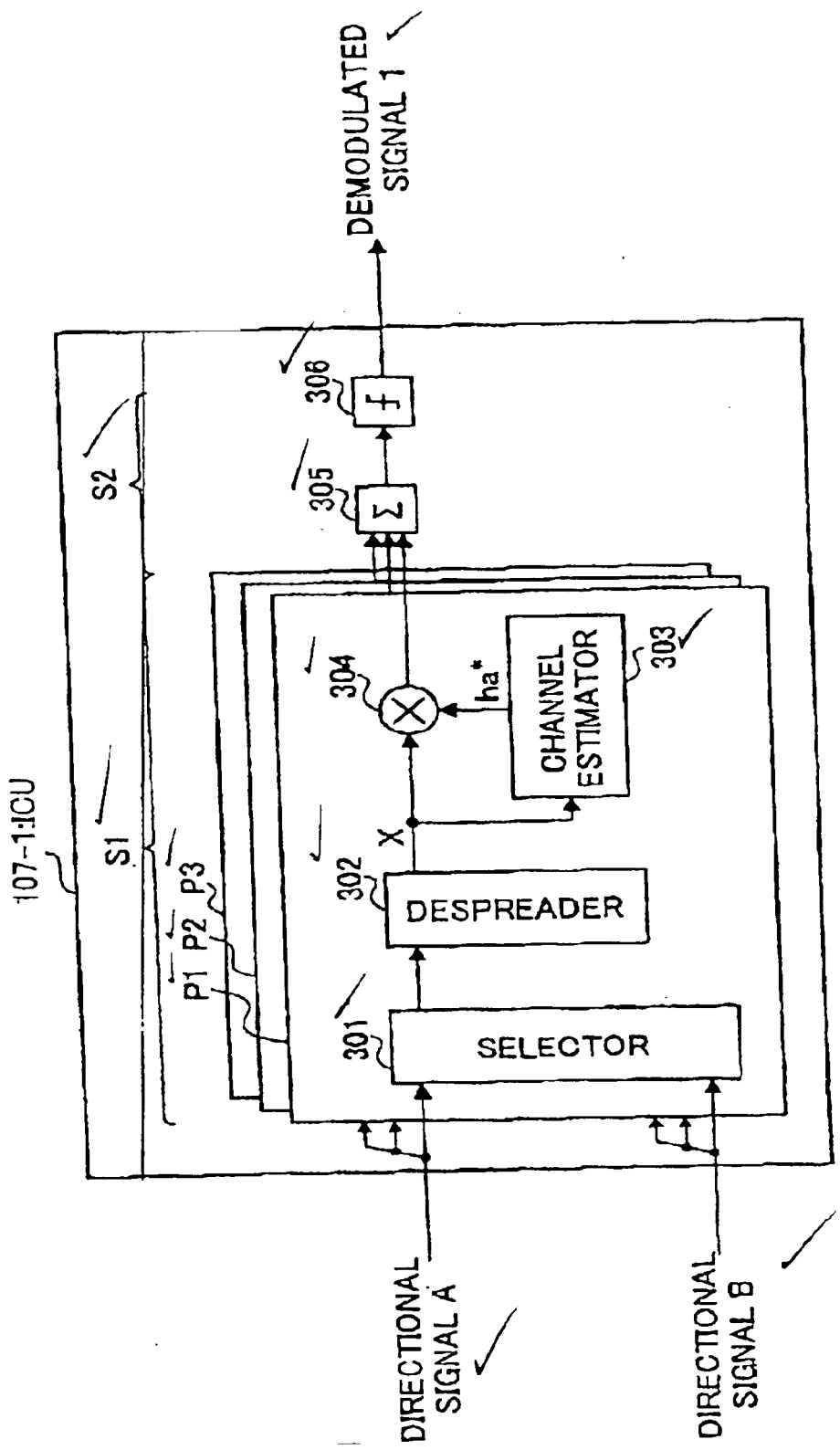
FIG. 7 is a block diagram illustrating the configuration of ICU of a third stage of the conventional interference signal canceling apparatus according to the above embodiment of the present invention.

FIG. 6 is a block diagram illustrating a schematic configuration of ICU 103-1 illustrated in FIG. 4, and FIG. 7 is a block diagram illustrating a schematic configuration of ICU 17-1 illustrated in FIG. 4.

In FIG. 6 and FIG. 7, it is assumed that the number of multipath to the radio receiving apparatus is 3 and that the respective configuration parts for the respective paths are shown by P1 to P3, respectively. Since the respective configuration parts for the respective paths have the same configuration and operation, only the first path P1 is explained, and the explanation of the second path P2 and third path P3 is omitted.

In FIG. 6, the ICU 103-1 is divided into a front stage S1 where any one of the directional signal A and the directional signal B is selected every path and is subjected to despreading, thereafter compensating for a channel variation; a middle stage S2 where RAKE combining and temporary determination are carried out, and a back stage S3 where the signal subjected to temporary determination is re-spread to generate replica signals and the replica signals are distributed every path to be outputted.

The directional signal A and the directional signal B are inputted to a selector 301. The selector 301 selects one directional signal corresponding the group to which the signal transmitted from the user 1 belongs from the directional signal A and the directional signal B on the path-by-path basis. For example, in the case where the signal, which has been arrived via path P1 from the user 1 belongs to the group of the directional signal A, the selector 301 selects the directional signal A. The signal sleeted by the selector 301 is outputted to a despreader 302.

The despreader 302 provides despreading to the output signal of the selector 301 to generate a despread signal X. The despread signal X is outputted to a channel estimator 303 and a multiplier 304.

The channel estimator 304 performs the channel estimation based on the despread signal X and outputs a complex conjugate $h_a^*$ of a channel estimation value ha to the multiplier 304, and outputs the channel estimation value ha to a multiplier 307. The multiplier 304 multiplies the despread signal X by the complex conjugate $h_a^*$ of the channel estimation value. This compensates for phase rotation of the despread signal X. The output signal of the multiplier 26 of each of paths P1 to P3 is inputted to a RAKE combiner 305 of the middle stage S2.

The RAKE combiner 305 provides RAKE combining to the despread signals X of the respective paths P1 to P3, and a determining device 306 performs temporary determination to the RAKE combined signal outputted from the RAKE combiner 305. A signal d, which has been subjected to temporary determination and which outputted from the determining device 306, is inputted to the multiplier 307 of the back stage S3.

The multiplier 307 of the back stage S3 multiplies the signal d subjected to temporary determination by the channel estimation value $h_a$ for each of paths P1 to P3. This obtains replica signals Xr corresponding to the despread signals X. The replica signals Xr are inputted to a re-spreader 308.

The re-spreader 308 spreads the replica signals Xr and outputs the resultant to a divider 309. The divider 309 divides the replica signals Xr into the replica signal Xr belonging to the directivity A and the replica signal Xr belonging to the directivity B. Then, the re-spreader 308 outputs the replica signal Xr belonging to the directivity A to an adder 310-1 and the replica signal Xr belonging to the directivity B to an adder 310-2.

The adder 310-1 adds the replica signal Xr belonging to the directivity A among the replica signals Xr to generate a replica signal A, and outputs the replica signal A to an adder 106-1. Similarly, the adder 310-1 adds the replica signal Xr belonging to the directivity B among the replica signals Xr to generate a replica signal B, and outputs the replica signal B to an adder 106-2.

Next, the ICU 107-1 of the third stage will be described. The ICU 107-1 of the third stage illustrated in FIG. 7 has substantially the same configuration as that of the front stage S1 and middle stage S2 of the ICU 103-1. Accordingly, in the ICU 107 illustrated in FIG. 7, the same reference numerals are added to the configuration portions common to the ICU 12-1 illustrated in FIG. 6, and the explanation thereof will be omitted.

The output signal of the determining device 306 of the ICU 107-1 is outputted to an external apparatus (not shown) as a demodulation signal.

In this way, directivity is formed using the array antenna, and selection of directivity every antenna and distribution are performed to generate a replica signal every directivity, and this eliminates the need for providing the weight calculators and the reception weight calculators in the ICUs. As a result, the number of calculations and the circuit scale of the interference signal canceling apparatus can be reduced.

Figure 1:
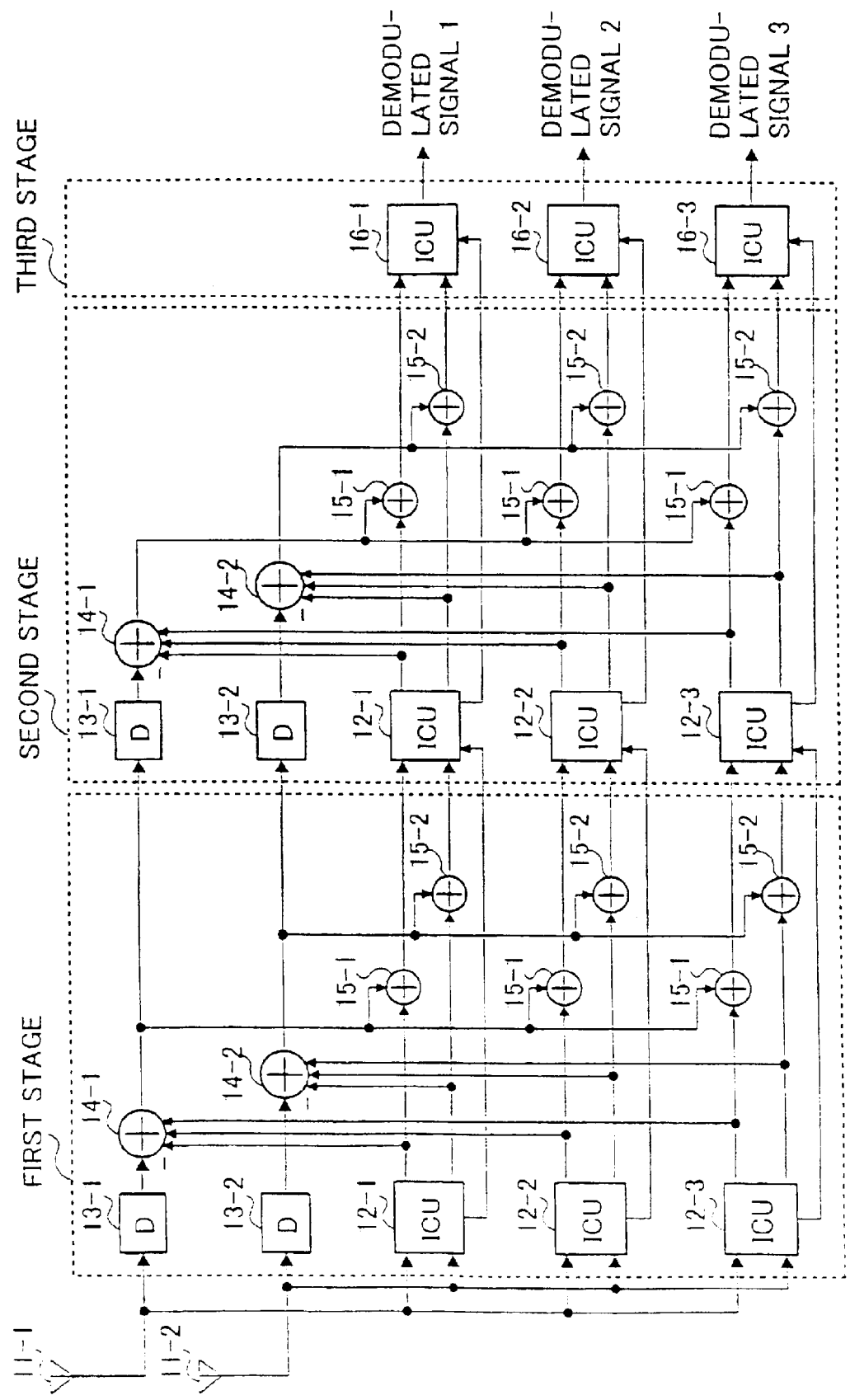
FIG. 1 is a block diagram illustrating the configuration of a conventional interference signal canceling apparatus.
Figure 2:
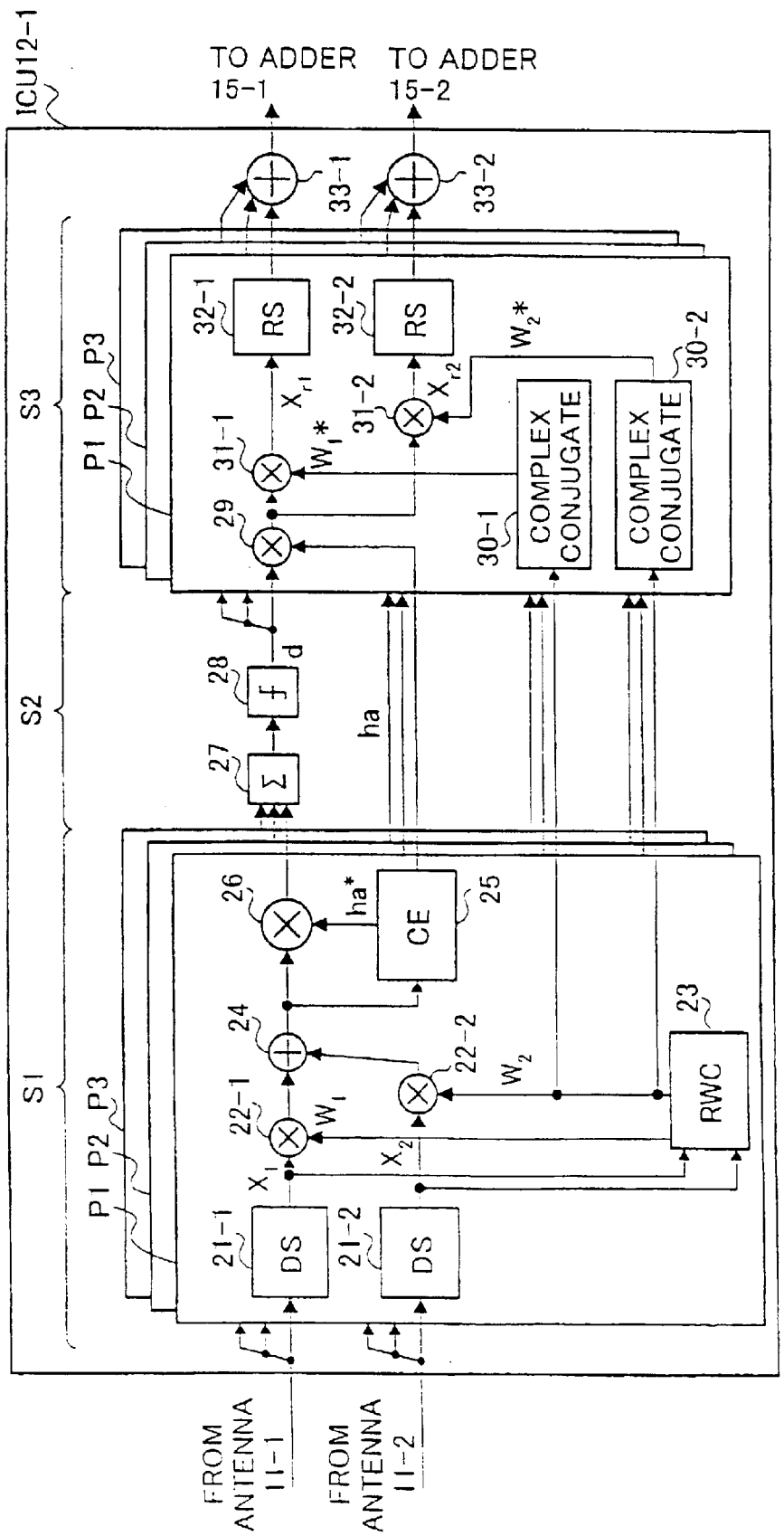
FIG. 2 is a block diagram illustrating the configuration of ICU of each of first and second stages of the conventional interference signal canceling apparatus.
Figure 3:
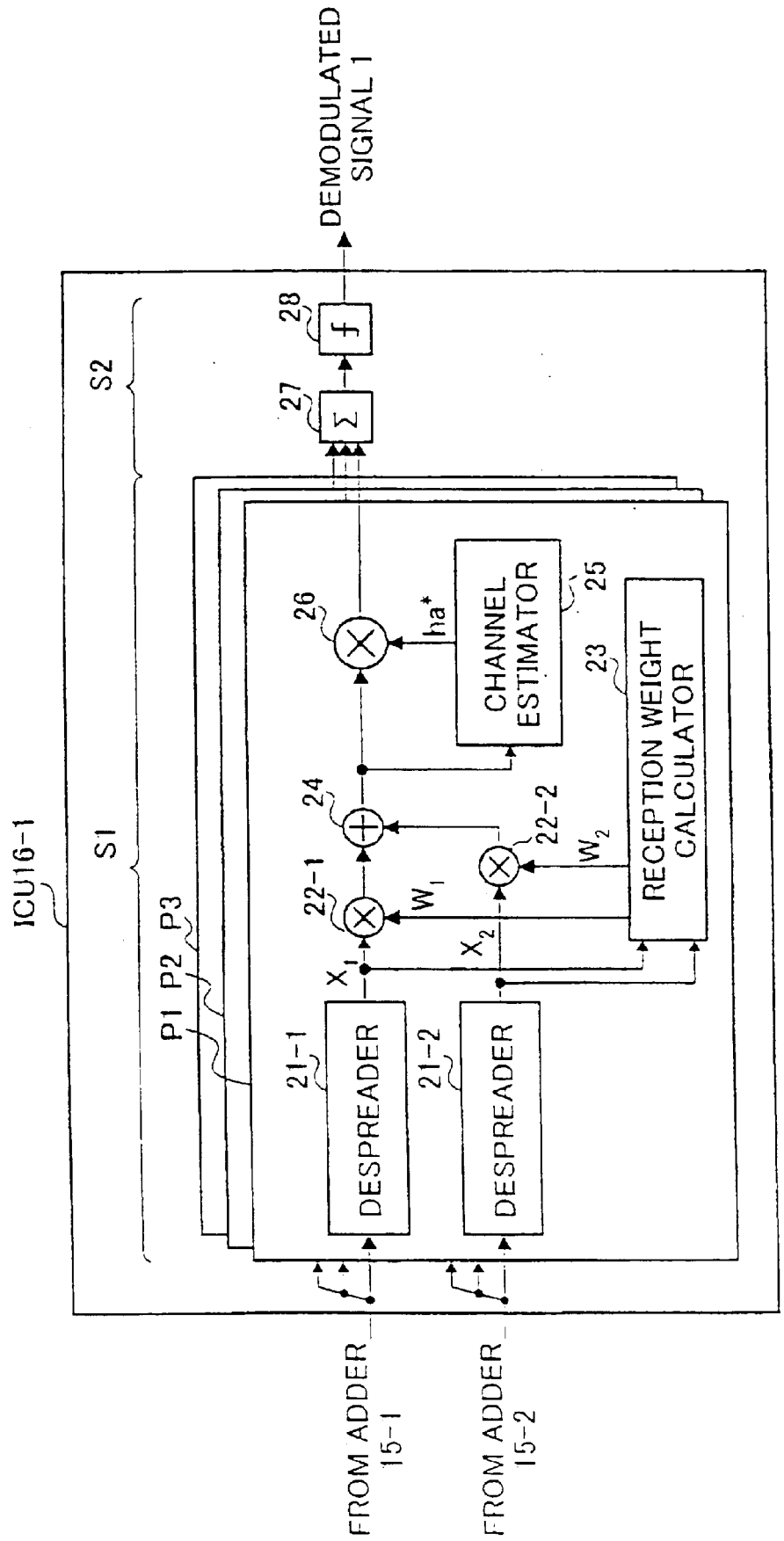
FIG. 3 is a block diagram illustrating the configuration of ICU of a third stage of the conventional interference signal canceling apparatus.

Here, assuming that the number of users is L, the number of antennas is K, the number of paths is M, and the number of groups is G. It is unnecessary to provide the reception weight multipliers to the array antenna, which is combined with the interference signal canceling apparatus of FIG. 1 explained as prior art. In contrast to this, it is necessary to provide (K×G) reception weight multipliers to the array antenna, which is combined with the interference signal canceling apparatus of the present invention of FIG. 4.

Moreover, the number of reception weight multipliers, which is necessary as an entirety of apparatus, is G in the interference signal canceling apparatus of the present invention. Hence, the number of reception weight multipliers can be reduced as compared with the interference signal canceling apparatus of FIG. 1, which needs (L×M) reception weight multipliers as an entirety of apparatus.

The above embodiment has explained using the multi-stage type the interference signal canceling apparatus. The present invention is not limited to this, and the number of calculations and the circuit scale can be reduced even if a single-stage type interference signal canceling apparatus, which cancels interference on a symbol-by-symbol basis, is used.

As is obvious from the above explanation, according to the interference signal canceling apparatus and its interference signal canceling of the present invention, it is unnecessary to provide the reception weight calculators and the reception weight multipliers to the ICUs, making it possible to reduce the number of calculations and the circuit scale.

This application is based on the Japanese Patent Application No. HEI 12-010877 filed on Jan. 19, 2000, entire content of which is expressly incorporated by reference herein

INDUSTRIAL APPLICABILITY

The present invention is suitable for use in a base station apparatus in a CDMA mobile communication system.

What is claimed is:

1. A multistage interference signal canceling apparatus that cancels interference from a directional array combined signal that is received by an array antenna and array combined on a directivity-by-directivity basis, said apparatus comprising:

an interference canceling unit for generating, at every stage, a replica signal of a user;

delay means for delaying, at a stage other than a final stage, a received signal by a processing time of the interference canceling unit;

canceling means for removing replica signals of all users from the received signal of each directivity, and obtaining a residual signal of the user;

adding means for adding the replica signal and the residual signal on a per user basis, and outputting the result to an interference canceling unit of a next stage, wherein the interference canceling unit comprises:

directivity selecting means for selecting the directional array combined signal on a per path basis;

<despreading means for detecting a correlation value between the selected directional array combined signal and a spreading code, combining means for combining detected correlation values to generate a combined value;

temporary determining means for temporarily determining the combined value to generate a temporarily determined value;

re-spreading means for re-spreading the temporarily determined value to generate a re-spread signal;

dividing means for sorting re-spread signals for every directivity, on a per path basis; and adding means for adding the re-spread signals sorted for every directivity to generate a replica signal.

2. The interference signal canceling apparatus according to claim 1, wherein said canceling means cancels replica signals of other users from the directional array combined signal.

3. A base station apparatus having an array antenna and an multistage interference signal canceling apparatus that cancels interference from a directional array combined signal that is received by an array antenna and array combined on a directivity-by-directivity basis, said multistage interference signal canceling apparatus comprising:

an interference canceling unit for generating, at every stage, a replica signal of a user;

delay means for delaying, at a stage other than a final stage, a received signal by a processing time of the interference canceling unit;

canceling means for removing replica signals of all users from the received signal of each directivity, and obtaining a residual signal of the user;

adding means for adding the replica signal and the residual signal on a per user basis, and outputting the result to an interference canceling unit of a next stage, wherein the interference canceling unit comprises:

directivity selecting means for selecting the directional array combined signal on a per path basis;

despreading means for detecting a correlation value between the selected directional array combined signal and a spreading code, combining means for combining detected correlation values to generate a combined value;

temporary determining means for temporarily determining the combined value to generate a temporarily determined value;

re-spreading means for re-spreading the temporarily determined value to generate a re-spread signal;

dividing means for sorting re-spread signal for every directivity, on a per path basis; and adding means for adding the re-spread signals sorted for every directivity to generate a replica signal.

4. An interference cancellation method for use in a multistage interference cancellation apparatus that removes interference from a directional array combined signal that is received by an array antenna and array combined on a directivity-by-directivity basis, said method comprising, in an interference canceling unit, the steps of:

inputting a plurality of array combined signals subjected to array combining on a directivity-by-directivity basis to select an array-combined signal corresponding to a path;

detecting a correlation value between the selected array combined signal and a spread code;

combining detected correlation values to generate a combined value;

temporarily determining the combined value to generate a temporarily determined value;

re-spreading the temporarily determined value to generate a re-spread signal;

sorting re-spread signals or every directivity, on a per path basis; and adding the re-spread signals sorted for every directivity to generate a replica signal.

* * * * *